Patented Jan. 10, 1939

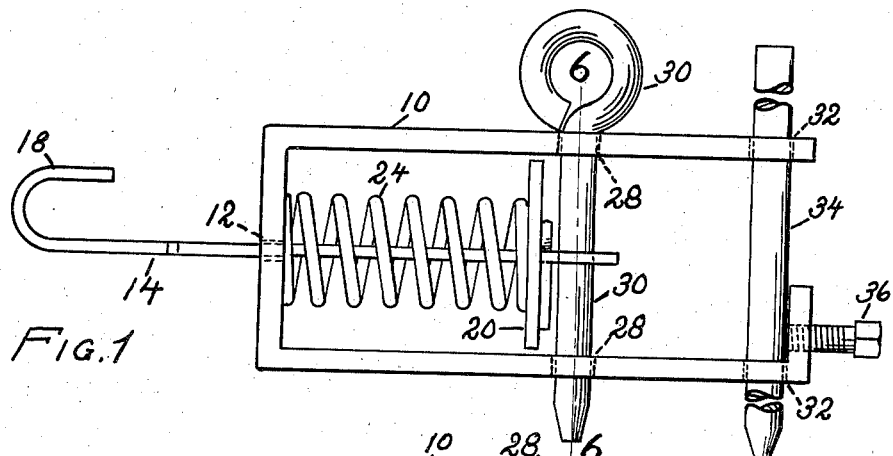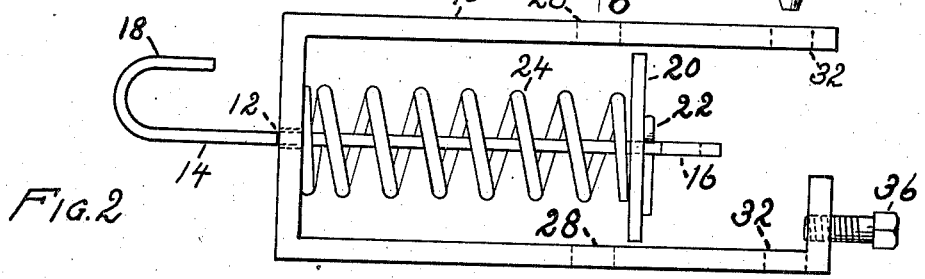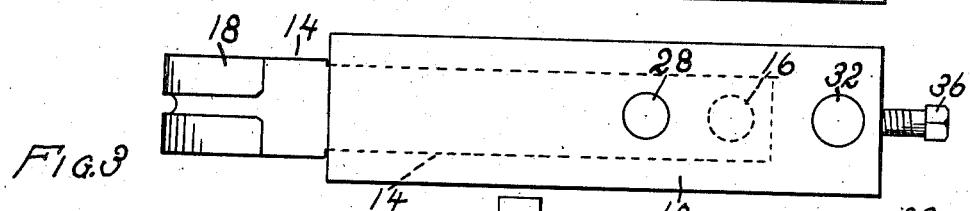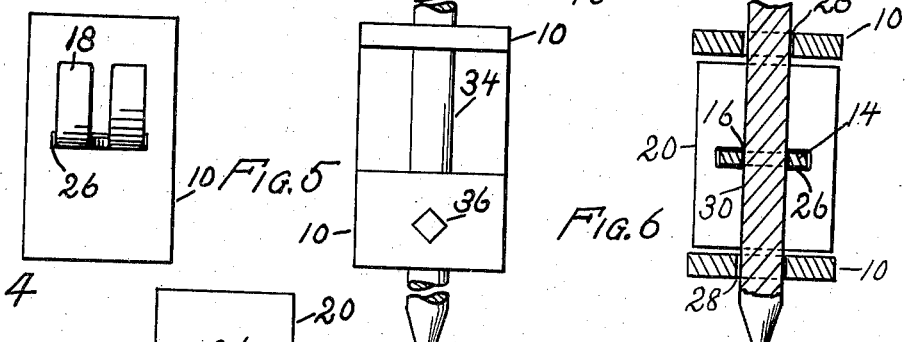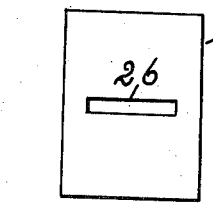

2,143,363

UNITED STATES PATENT OFFICE 2,143,363

TENSION GAUGE AND CHECKING STAKE

Marvin W. Sprague, Wheatfield, Ind.

Application June 18, 1937, Serial No. 148,890

5 Claims. (Cl. 111—49)

This invention relates to an improved tension gauge and checking stake which is especially adaptable for use in certain kinds of planting.

In planting certain crops such as corn, beans and the like planting machines which are operated by a check wire are generally used for depositing the seed in the ground. Because of variations in the tension of the check wire as it was moved from row to row considerable difficulty has been experienced in dropping the seed in anything approaching accurate alignment. This misalignment of the cross rows often prevented the cross cultivating of the crops. And occasionally where such cross cultivation was undertaken many of the young plants were uprooted because of their misalignment.

One of the principal objects of importance and advantage of the improved tension gauge and checking stake of this invention resides in the provision of means for eliminating misalignment of the cross or check rows.

Another important object of advantage is the provision of means for exerting a uniform tension on the check wire as the anchorage therefor is shifted from point to point without depending on the operators judgment.

A still further object of importance resides in the provision of means for causing the check rows to come in accurate alignment regardless of change in operators or operating conditions.

Still another object of advantage resides in the provision of means maintaining the device immovable once the proper tension has been obtained.

Additional objects of importance and advantage will become apparent as the following detailed description progresses, reference being had to the accompanying drawing wherein, Fig. 1 is a side elevational view of a tension gauge and checking stake which embodies the invention.

Fig. 2 is a side elevational view of the device with the checking pin and stake removed.

Fig. 3 is a top plan view of the device as shown in Fig. 2.

Fig. 4 is an end elevational view taken from the front.

Fig. 5 is an end elevational view taken from the rear.

Fig. 6 is a section taken on line 6—6 of Fig. 1.

Fig. 7 is a front elevational view of a spring retaining member.

As shown in the drawing:

The reference numeral 10 indicates generally the body of the improved tension gauge and checking stake of this invention. In the preferred embodiment of the invention the body 10 is preferably formed of strap metal and is substantially of clevis formation as is clearly shown in the drawing.

Formed in the forward end of the clevis shaped body 10 is a slot 12, as is best shown by the dotted lines in Figs. 1 and 2. The slot 12 is preferably formed centrally of the top and bottom and is horizontal although it will be obvious that it may be vertical or otherwise if desired.

Extending through the slot 12 and projecting each way therefrom is a connecting member 14. The inwardly projecting portion of the connecting member normally extends parallel to the top and bottom of the body 10 to a point beyond the mid section of the device. An aperture 16 is formed in this end of the connecting member 14. It will be apparent that more than one aperture, such as aperture 16, may be formed in the connection member 14 in order that the tension of the check wire may be varied to meet requirements.

The outwardly projecting portion of the connection member 14 is curled upwardly and thence backwardly upon itself to form a hook 18 as is clearly shown in the drawing. The hook 18 is preferably bifurcated as is best shown in Figs. 3 and 4 to enable a check wire to be readily attached or secured thereto.

Positioned on the inwardly projecting portion of the connecting member 14 and secured thereto by a spring retaining member 20 and cotter key 22 is a tension spring 24. The tension spring 24 is adapted to exert a pressure against the spring retaining member at all times.

Formed in the central portion of the spring retaining member 20 is a transverse slot 26. The spring retaining member 20 is slidably secured on the connecting member 14 and being of rectangular formation, as is best shown in Figs. 6 and 7, prevents independent rotational movement of the connecting member 14 with respect to body 10.

Formed in the upper and lower portions of the body 10 intermediate the ends thereof are aligned checking pin receiving apertures 28, 28. A checking pin 30 is adapted to be removably positioned in the aligned apertures.

Formed in the top and bottom portions of the clevis shaped body 10 closely adjacent the open end thereof are aligned stake receiving apertures 32.

The body 10 and its component parts may be adjustably positioned on a stake 34 in the manner best shown in Fig. 1. The set screw 36 provides a means for maintaining the improved tension gauge and checking stake of this invention at any desired height on the stake 34.

The operation of the improved device of this invention is extremely simple and consists of the following: one end of the check wire is made fast and the other end thereof is attached to the hook 18. The device is positioned on a stake 34 and sufficient tensional force is exerted upon the stake 34 to draw the aperture 16 in the connecting member 14 in alignment with the apertures 28, 28, in the body 10. When the three apertures are in alignment the stake 34 is pushed into the ground or otherwise anchored and the checking pin 30 is inserted through the aligned apertures 28, 16 and 28.

It will be obvious that the same amount of energy is required each time the aperture 16 is drawn into the alignment with the apertures 28. Therefore, the tension exerted on the check wire will at all times be uniform.

Moreover, when the checking pin 30 is dropped into the aligned apertures a rigid and unyielding connection is made between the anchored stake 34 and the check wire.

It will therefore be apparent that as the tension on the check wire is at all times uniform when anchored at various points and the wire itself is unyieldingly secured, the check or cross rows will be in alignment.

It will be obvious from the foregoing that herein is provided a simple and rugged device which in addition to being practically indestructible is fool proof and may be used by operators unskilled in the art to which it appertains.

Additionally, the device is simple and may be economically manufactured.

I am aware that many changes may be made and numerous details of construction varied throughout a wide range without departing from the principles of this invention and I, therefore, do not purpose limiting the patent granted hereon other than is necessitated by the prior art and the terminology of the appended claims.

I claim as my invention:

1. In an anchor for check row wires, the combination with a clevis having a transverse slot in the forward end thereof of a connecting member having a hook formed on one end and a pin receiving opening in the other end thereof, a pair of aligned pin receiving openings in the intermediate portion of said clevis, said connecting member being inserted through the transverse slot in the forward end of the clevis, a spring member positioned on the inwardly projecting portion of the connecting member, and a spring retaining member adapted to prevent independent rotation of the connecting member positioned thereon, said connecting member being adapted to move longitudinally to bring the pin receiving opening in the end thereof into alignment with the pair of pin receiving openings in the intermediate portion of the clevis to allow a locking pin to be passed therethrough.

2. A tension gauge and checking stake comprising a clevis-shaped member, a connecting member receiving opening in the closed end of said clevis-shaped member, a connecting member projecting through said opening, said connecting member being longitudinally movable, spring means urging said connecting member into the clevis-shaped member, a pin receiving opening in said connecting member closely adjacent the inner end thereof, means for adjustably securing the clevis-shaped member to an anchor stake, and a pin receiving opening intermediate the ends of each longitudinal portion of the clevis-shaped member, said openings being in alignment and adapted to align with the opening in the connecting member for receiving a pin therethrough.

3. A tension gauge and checking stake comprising a clevis-shaped member, a connecting member receiving opening in the closed end of said clevis-shaped member, a connecting member projecting through said opening, said connecting member being longitudinally movable, means preventing independent rotational movement of said connection member, spring means urging said connecting member into the clevis-shaped member, means for adjustably securing the clevis-shaped member to an anchor stake, and means for locking said connecting member at a given point in its line of travel, said last named means comprising aligned pin receiving openings in the longitudinal portions of said clevis-shaped member and a pin receiving opening in said connecting member coacting with a removable pin, said pin receiving opening in the connecting member being adapted to move into alignment with the aligned pin receiving openings in the clevis-shaped member when an operable tension exerted on the device reaches a predetermined point.

4. A tension gauge and checking stake comprising a clevis-shaped member, a connecting member receiving opening in the closed end of said clevis-shaped member, a connecting member projecting through said opening, said connecting member being longitudinally movable, means on the outwardly projecting end of said connecting member for attaching a check wire thereto, spring means urging said connecting member into the clevis-shaped member, means for adjustably securing the clevis-shaped member to an anchor stake, and means for arresting the longitudinal movement of said connecting member at a given point in its line of travel, said last named means comprising a pin receiving opening in said connecting member alignable with like openings in the clevis-shaped member which are adapted to receive a pin therethrough.

5. A tension gauge for a check row wire comprising a member adapted to be fixed to an anchorage, a connecting member adapted to be attached to a check row wire and in longitudinally movable association with said first named member, spring means resisting the longitudinal separation of said members, and means definitely locking said members against longitudinal separation, said last named means comprising pin receiving openings in said fixed member and said connecting member adapted to move into alignment to receive a pin adapted to be inserted through said aligned pin receiving openings.

MARVIN W. SPRAGUE.